(12) United States Patent
Wakabayashi et al.

(10) Patent No.: US 7,974,167 B2
(45) Date of Patent: Jul. 5, 2011

(54) OPTICAL DISC APPARATUS, OPTICAL INFORMATION EQUIPMENT WITH THE OPTICAL DISC APPARATUS, AND FOCUSING CONTROL LSI IN THE OPTICAL DISC APPARATUS

(75) Inventors: Kanji Wakabayashi, Kyoto (JP); Yoshiaki Komma, Osaka (JP); Fumitomo Yamasaki, Nara (JP); Toshiyasu Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 650 days.

(21) Appl. No.: 11/960,973

(22) Filed: Dec. 20, 2007

(65) Prior Publication Data

US 2008/0151711 A1    Jun. 26, 2008

(30) Foreign Application Priority Data

Dec. 26, 2006    (JP) .................................. 2006-349168

(51) Int. Cl.
*G11B 7/002*    (2006.01)
(52) U.S. Cl. .................................. 369/53.28; 369/44.13
(58) Field of Classification Search ................ 369/47.14, 369/53.23, 53.28, 44.13
See application file for complete search history.

(56) References Cited

U.S. PATENT DOCUMENTS

| | | | |
|---|---|---|---|
| 6,529,455 B1* | 3/2003 | Okajima et al. | 369/44.25 |
| 6,552,971 B2* | 4/2003 | Iida | 369/44.29 |
| 6,721,244 B2* | 4/2004 | Kubota | 369/44.27 |
| 7,317,667 B2* | 1/2008 | Kanekami et al. | 369/44.13 |
| 2002/0003755 A1* | 1/2002 | Fujita et al. | 369/44.23 |
| 2005/0162999 A1* | 7/2005 | Yamashita | 369/44.34 |
| 2007/0014206 A1* | 1/2007 | Boku et al. | 369/44.23 |

FOREIGN PATENT DOCUMENTS

| | | |
|---|---|---|
| JP | 2002-230792 | 8/2002 |
| JP | 2003-91833 | 3/2003 |

* cited by examiner

*Primary Examiner* — Wayne R Young
*Assistant Examiner* — Thomas D Alunkal
(74) *Attorney, Agent, or Firm* — Wenderoth, Lind & Ponack, L.L.P.

(57) ABSTRACT

In the present invention, at the time of pulling a focus on an information recording surface of a disc, a focus servo is first pulled in a disc surface of the disc, and with the servo in a settled state, a driving signal necessary for following surface wobble is stored, and a focus is pulled in the information recording surface of the disc based upon a signal superimposed with the driving signal and a focus search driving signal.

17 Claims, 11 Drawing Sheets

OPTICAL DISC APPARATUS, OPTICAL INFORMATION EQUIPMENT WITH THE OPTICAL DISC APPARATUS, AND FOCUSING CONTROL LSI IN THE OPTICAL DISC APPARATUS

BACKGROUND OF THE INVENTION

1. Field of the Invention

The present invention relates to an optical disc apparatus which optically records a signal on an optical disc by means of a light source such as a laser, or reproduces a signal from the optical disc, and particularly relates to the optical disc apparatus which performs focus control where a focus on the optical disc of a light beam is controlled. The present invention further relates to optical information equipment with such optical disc apparatus, and a focus pull-in control LSI provided in the optical disc apparatus.

2. Description of the Related Art

In order to optically record or reproduce information on or from an information carrier by means of an optical source such as a laser, it is necessary to perform focus control such that an information recording surface of the optical disc is constantly located in a focus (converging point) position of a light beam. For realizing this, a so-called focus pull-in operation is performed where an objective lens is moved to bring the focus position of the light beam to the information recording surface of the optical disc prior to the focus control.

Further, in recent optical disc apparatuses, at the request for its increased capacity and reduced thickness, the necessity has arisen for narrowing a distance between the optical disc and the objective lens, a so-called working distance (hereinafter also referred to as WD).

First, narrowing the WD of the objective lens is most effective for attempting to reduce the apparatus thickness. This is because narrowing the WD of the objective lens can not only simply narrow the distance between the optical disc and the lens but also reduce an aperture of the lens as well as a diameter of a raised mirror, and hence the apparatus thickness can be reduced on a further larger scale than the narrowed amount of the WD itself.

Further, a resolution limit is required to be raised with the aim of increasing a recording density for attempting to increase the capacity of the optical disc, which requires an increase in numerical aperture of the objective lens. This leads to an extremely small WD.

As a result of this, there has been a risk in the conventional optical disc apparatuses that at the time of a focus pull-in operation, the objective lens collides with a disc surface of the optical disc to cause damage to the optical disc or the lens system.

Therefore, a variety of measures have been contrived for solving the problem of the collision at the time of the focus pull-in operation.

For example, a conventional optical disc apparatus shown in Japanese Patent Laid-Open Application No. 2003-91833 is provided with a non-contact sensor capable of detecting vertical vibration of the optical disc, and drives an objective lens actuator such that the objective lens gradually approaches the optical disc while making almost the same movement as the vertical movement of the optical disc, to conduct a focus search. It is thereby possible to realize the focus pull-in in which the disc and the objective lens do not collide even in the condition of the narrow WD.

Further, in a conventional optical disc apparatus shown in Japanese Patent Laid-Open Application No. 2002-230792, at the time of pulling a focus on the information recording surface of the optical disc, after a focus servo has once been pulled in the optical disc surface, the objective lens is jump-controlled to pull the focus servo on the information recording surface of the optical disc. It is thereby possible to increase a distance corresponding to a thickness of the substrate of the optical disc as a WD margin at the time of the pull-in of the focus servo, so as to prevent collision between the objective lens and the recording medium.

However, according to Japanese Patent Laid-Open Application No. 2003-91833, the non-contact sensor is required to be separately provided in the optical head device, resulting in increased cost and degraded salability of the product.

Further, the non-contact sensor is required to be installed in a position apart from the objective lens, and hence displacement of the installation position brings about a surface wobbling amount detection error with respect to the objective lens. For example, assuming that the non-contact sensor is installed several tens mm apart from the objective lens in a radial direction of the optical disc, an error of as large as the order of 150 μm is generated with respect to a surface wobbling amount of 300 μm. Or, assuming that the non-contact sensor is installed in a position several tens mm apart from the objective lens in a tangential line direction of the optical disc, the maximum amplitude amount of surface wobble of the optical disc can be detected with almost no error, but phase displacement of a positional variation period occurs, with a phase displacement amount of the order of 40 deg. When this phase displacement is converted into a positional displacement of the optical disc on the middle periphery thereof, the converted displacement amount is of the order of 90 μm. Therefore, since the installment position of the non-contact sensor is apart from the objective lens, the vertical movement detection error due to the surface wobble of the optical disc is large. There thus is a possibility that the optical disc and the objective lens collide at the time of the focus pull-in operation.

Further, individual variation of the non-contact sensors and sensitivity variations of the same due to an installation error are large. As a result, the vertical movement detection error increases due to the surface wobble of the optical disc, which may lead to collision between the optical disc and the objective lens at the time of the focus pull-in operation.

Moreover, according to Japanese Patent Laid-Open Application No. 2002-230792, after the focus servo has once been pulled in the disc surface of the optical disc, the focus of the light beam is jumped to the information recording surface by the jumping operation.

Here, a relative speed of the disc and the lens at the time of switching the servo is called a rushing speed, and a speed range in which a focus detection range is not exceeded is called a rushing speed limit in a case where the objective lens is decelerated at the maximum in the focus servo process.

It is in the case of the rushing speed being within the rushing speed limit depending upon a focus error detection range that the pull-in of the focus servo is safely performed in switching the focus servo process.

In the case of a normal optical disc, the focus error detection range is of the order of 20 μmPP, whereas in the case of a high-density two-layered disc or the like, the focus error detection range is limited to the order of 5 μm PP. This causes the danger of exceeding the rushing speed limit even at a normal rotational speed.

Therefore, according to Japanese Patent Laid-Open Application No. 2002-230792, the relative speed of the disc and the lens immediately after the switch to the jumping operation should at least be a speed of a value obtained by adding a jumping speed and a surface wobbling speed. In addition to this, in the jumping operation, a jump is required to be taken a distance corresponding to the air converted from the thickness of the optical disc substrate. With the jumped distance being long, the relative speed may further increase due to sensitivity variations of the objective lens actuator and power voltage variations. It is therefore thought that in an apparatus where the rushing speed limit decreases, the rushing speed increases and thus easily exceeds the rushing speed limit. Consequently, the disc surface and the objective lens collide, causing the danger of damage to the disc or the objective lens.

Moreover, when the focus pull-in by the jumping operation fails, the objective lens has entered in a wobbling range due to the surface wobble of the optical disc, and the optical disc and the objective lens would almost collide.

SUMMARY OF THE INVENTION

The present invention is made for solving the above problems, and has an object to provide an optical disc apparatus capable of removing an influence of surface wobble of an optical disc and performing pull-in of a focus servo without collision between an objective lens and the optical disc even when a WD of the objective lens is set to be narrow due to an increased density and a reduced thickness of the optical disc, optical information equipment with the optical disc apparatus, and a focus pull-in control LSI in the optical disc apparatus.

In order to achieve the above objective, the present invention provides an optical disc apparatus with the following configuration.

According to an optical disc apparatus in a first aspect of the present invention, the optical disc apparatus, comprising: an optical head device configured to have an objective lens and an objective lens actuator for moving the objective lens at least in a vertical direction to an optical disc, and converge and apply a light beam to the optical disc via the objective lens by moving the objective lens; a focus error detection circuit configured to generate a focus error signal in accordance with positional displacement of a focus of the light beam with respect to a disc surface or an information recording surface of the optical disc; a focus control circuit configured to control the objective lens actuator based upon the focus error signal obtained by the focus error detection circuit to allow the focus position of the light beam to follow the disc surface or the information recording surface; a surface wobble following signal storage device configured to store a surface wobble following signal as a driving signal that is applied to the objective lens actuator when the focus position is allowed to follow the disc surface; a focus search driving signal generation circuit configured to generate a focus search driving signal as a driving signal for changing the focus position of the light beam with respect to the optical disc; a superimposition signal generation circuit configured to generate a signal superimposed with the surface wobble following signal stored in the surface wobble following signal storage device and the focus search driving signal generated by the focus search driving signal generation circuit; and a focusing control circuit, after achieving a focus servo on the disc surface of the optical disc, configured to control the objective lens actuator based upon the superimposition signal generated by the superimposition signal generation circuit and achieve a focus on the information recording surface of the optical disc.

According to an optical disc apparatus in a second aspect of the present invention, the optical disc apparatus may be designed so that the optical head device includes a light source that emits light beams with a plurality of wavelengths or a plurality of light sources that emit light beams with different wavelengths correspondingly to reproduction of a plurality of kinds of optical discs, and the focusing control circuit achieves the focus servo on the disc surface of the optical disc by using a light beam with a focus distance longer than a focus distance in a light beam corresponding to the optical disc where recording and reproduction are performed, among the plurality of light beams with the wavelengths.

According to an optical disc apparatus in a third aspect of the present invention, the optical disc apparatus may be designed so that the optical head device includes a light source that emits light beams with a plurality of wavelengths or a plurality of light sources that emit light beams with different wavelengths correspondingly to reproduction of a plurality of kinds of optical discs, and a plurality of objective lenses; and the focusing control circuit achieves the focus servo on the disc surface of the optical disc by using a combination of the objective lens and the light source generating a light beam with a focus distance longer than a focus distance in a combination of the objective lens and the light source which are used correspondingly to the optical disc where recording and reproduction are performed, among the light source or sources emitting the plurality of light beams and the plurality of objective lenses.

According to an optical disc apparatus in a fourth aspect of the present invention, the optical disc apparatus may be designed so that the light source that emits the light beam with the longer focus distance is a light source that emits red light or infrared light.

According to an optical disc apparatus in a fifth aspect of the present invention, the optical disc apparatus may be designed so that the focus distance of the objective lens through which the light beam with the longer focus distance of the objective lens passes is longer than a surface wobbling amount of the optical disc where recording and reproduction are performed.

According to an optical disc apparatus in a sixth aspect of the present invention, the optical disc apparatus may be designed so that, at the time of achieving the focus servo on the disc surface of the optical disc, the focusing control circuit achieves the focus servo on a position where focus displacement due to spherical aberration corresponding to a substrate thickness of the optical disc is previously corrected.

According to an optical disc apparatus in a seventh aspect of the present invention, the optical disc apparatus may be designed so that the apparatus further includes a spherical aberration correction actuator configured to move a collimator lens so as to correct spherical aberration generated due to a change in substrate thickness of the optical disc, wherein the focusing control circuit previously arranges the collimator lens to a correction position for the case of the substrate having the smallest thickness, at the time of achieving the focus servo on the disc surface of the optical disc.

Further, an optical information equipment in an eighth aspect of the present invention comprises the optical disc apparatus in any of the first to seventh aspects and a computing device configured to compute information reproduced by the optical disc apparatus.

A focus pull-in control LSI in a ninth aspect of the present invention is provided in an optical disc apparatus where an objective lens is moved by an objective lens actuator at least in a direction vertical to an optical disc to converge a light beam to the optical disc so that at least information is reproduced, the LSI comprising: a focus error detecting section configured to generate a focus error signal in accordance with positional displacement of a focus of a light beam with respect to a disc surface or an information recording surface of the optical disc; a focus control section configured to allow a focus position of the light beam to follow the disc surface or the information recording surface based upon the focus error signal obtained by the focus error detecting section; a surface wobble following signal storage section configured to store a surface wobble following signal as a driving signal that is applied to the objective lens actuator when the focus position is allowed to follow the disc surface; a focus search driving signal generating section configured to generate a focus search driving signal as a driving signal for changing the focus position of the light beam with respect to the optical disc; a superimposition signal generating section configured to generate a signal superimposed with the surface wobble following signal stored in the surface wobble following signal storage section and the focus search driving signal generated by the focus search driving signal generating section; and a focusing control section configured to achieve a focus servo on the disc surface of the optical disc, and subsequently achieve a focus on the information recording surface of the optical disc based upon the superimposition signal generated by the superimposition signal generating section.

According to the first aspect of the present invention, in a case of pulling a focus on an information recording surface of an optical disc, a focus servo is first pulled in a disc surface of the optical disc, and a surface wobble following signal as a driving signal necessary for following surface wobble is stored when the servo is in a settled state. Based upon a signal superimposed with the surface wobble following signal and a focus search driving signal, the focus is pulled in the information recording surface of the optical disc.

Therefore, since a focus-servo state is accomplished at the disc surface of the optical disc by means of a light beam for information reading or writing and then vertical movement of the optical disc due to the surface wobble thereof is detected, there is no need to separately provide a non-contact sensor, thus preventing an increase in cost caused by an added component.

Moreover, since the light beam that detects the vertical movement of the optical disc is emitted from the objective lens itself, a surface wobbling amount detection error is not generated, and naturally, phase displacement due to the surface wobble is not generated either.

Further, since detection of a distance from the optical disc by means of the light beam for reading or writing information can be made with accuracy by a focus error detection circuit mounted in an optical head device, the surface wobbling amount detection error is not generated.

Next, after the focus-servo state is accomplished to the optical disc surface, the surface wobble following signal as the driving signal for following the surface wobble is stored, and based upon the signal superimposed with the surface wobble following signal and the focus search driving signal, a focus search operation is performed on the information recording surface of the optical disc. Therefore, a relative speed of the objective lens and the information recording surface of the optical disc is a speed corresponding to an amount of the focus search operation except for an amount of vertical variation due to the surface wobble of the optical disc. Hence the rushing speed does not exceed the rushing speed limit in the focus pull-in.

Consequently, it is possible to realize the optical disc apparatus with high reliability and further low cost, in which the optical disc and the objective lens do not collide, thereby preventing damage to the optical disc and the objective lens.

According to the second aspect of the present invention, since a focus distance of the objective lens is set further longer, it is possible to further reduce the possibility for collision between the objective lens and the optical disc at the time of pulling the focus servo on the disc surface of the optical disc.

According to the third aspect of the present invention, at the time of pulling the focus servo on a record-type optical disc apparatus installing an optical head device in which a plurality of objective lenses suited for a record-type optical head device required to have higher reliability are installed in an objective lens actuator, the possibility for collision between the objective lens and the optical disc can be reduced, thereby enhancing reliability of the device so as to enhance salability of the product.

According to the forth aspect of the present invention, the operation for pulling a focus servo on the disc surface of the optical disc is preferably performed using a light source that emits red light or infrared light.

According to the fifth aspect of the present invention, the operation for pulling a focus on the disc surface of the optical disc can be realized with the objective lens not included in the range of vertical movement of the optical disc due to the surface wobble of the optical disc. It is therefore possible to reduce the possibility for collision between the objective lens and the optical disc.

According to the sixth aspect of the present invention, it is possible to perform a further accurate and stable operation for pulling a focus on the disc surface of the optical disc without reduction in margin of the focus error detection range.

According to the seventh aspect of the present invention, spherical aberration corresponding to the substrate thickness of the optical disc is corrected, to control positional displacement of the focus of the light beam due to spherical aberration, and it is thereby possible to perform a further accurate and stable operation of pulling the focus on the disc surface of the optical disc.

Further, the optical discs apparatus according to the first to seventh aspects of the present invention can be preferably applied to a variety of optical information equipment, such as a computer, an optical disc player, a car navigation system, an optical disc recorder, and an optical disc server.

Moreover, producing from an LSI a circuit portion for executing the focus pull-in control operation in the optical disc apparatus according to the first to seventh aspect allows an attempt to reduce the size and thickness of the optical disc apparatuses.

DETAILED DESCRIPTION OF THE PREFERRED EMBODIMENTS

Embodiment 1

Figure 1:
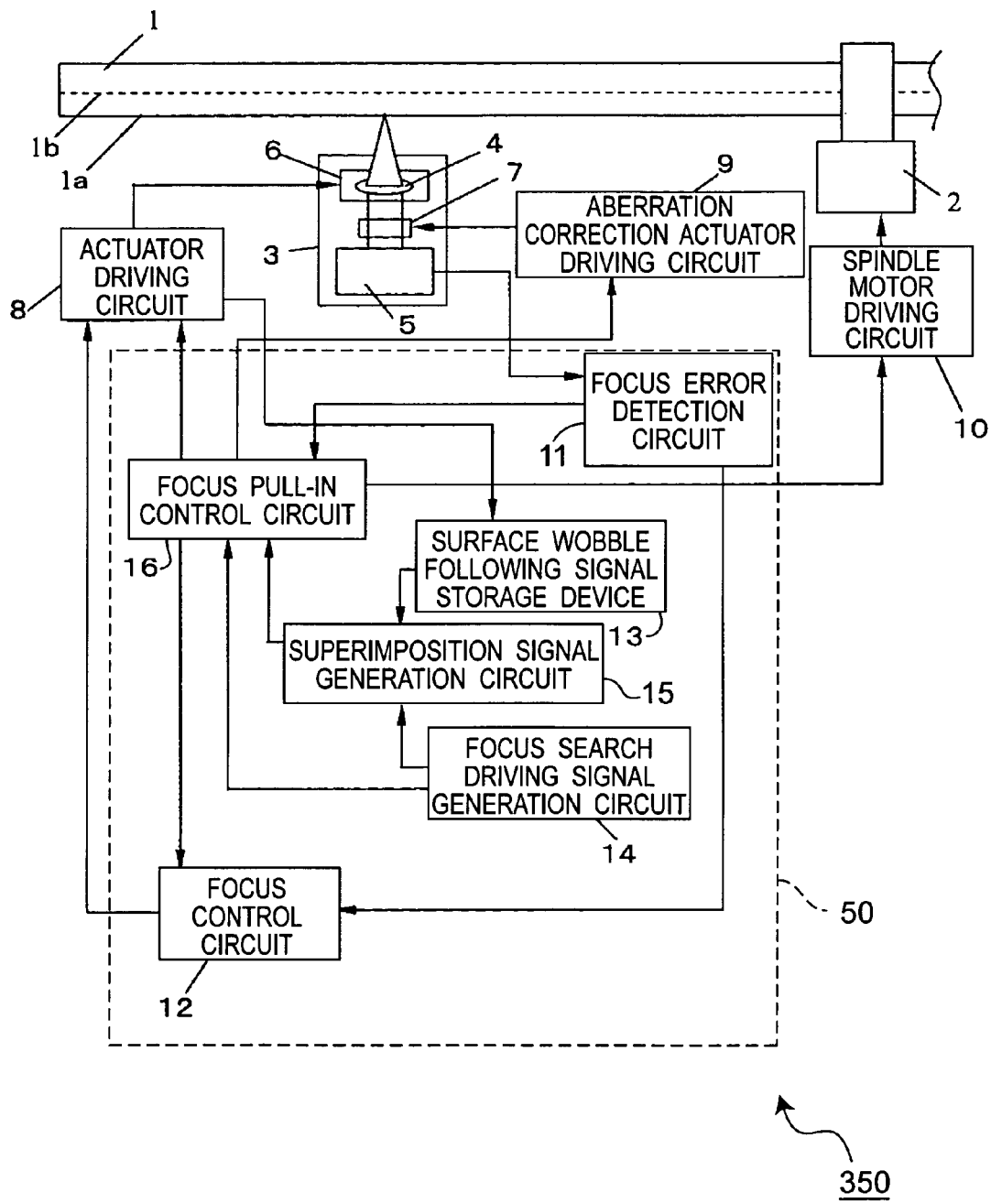
FIG. 1 is a block diagram showing a configuration of an optical disc apparatus according to Embodiment 1.

In the following, an optical disc apparatus according to Embodiment 1 of the present invention is described with reference to the drawings. It is to be noted that in the drawings, the same or similar constituents are provided with the same numerals.

Figure 2:
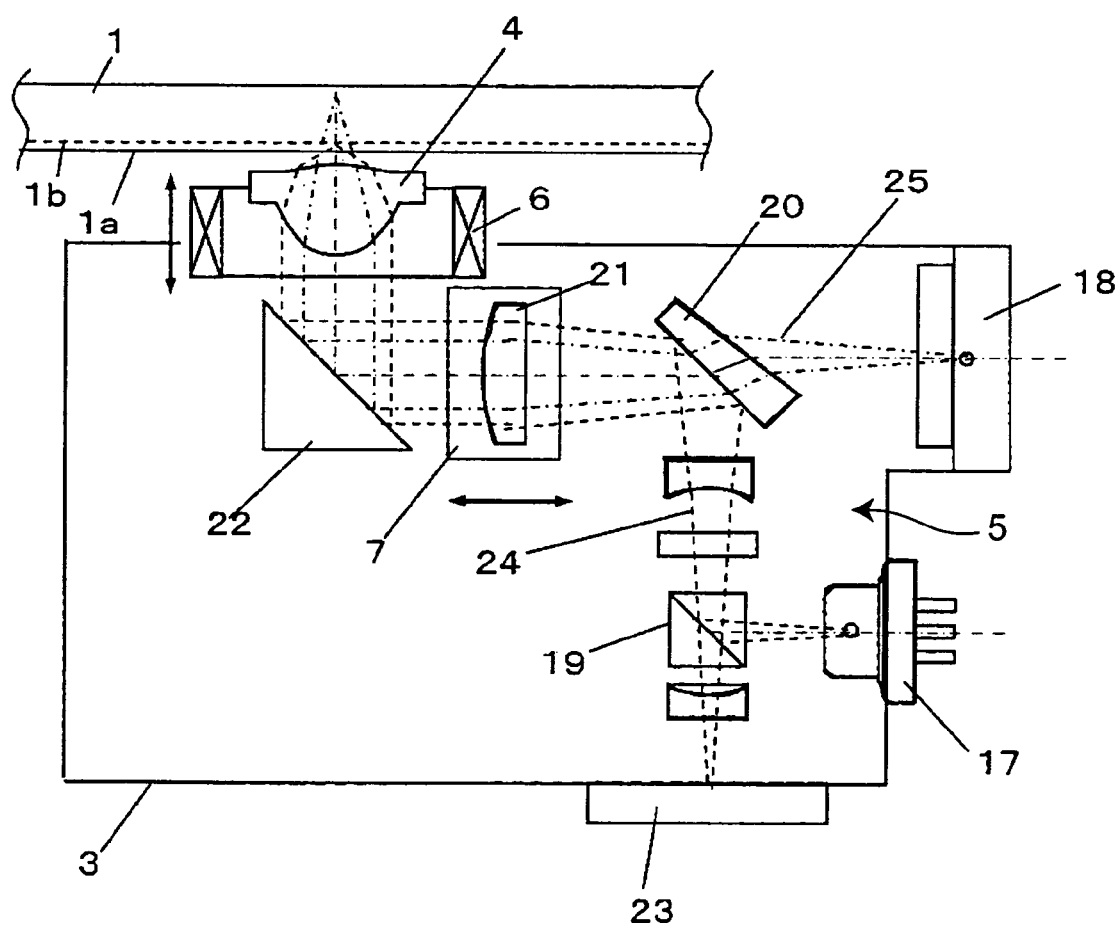
FIG. 2 is a schematic view showing a configuration of an optical head device in the optical disc apparatus according to Embodiment 1.
Figure 3:
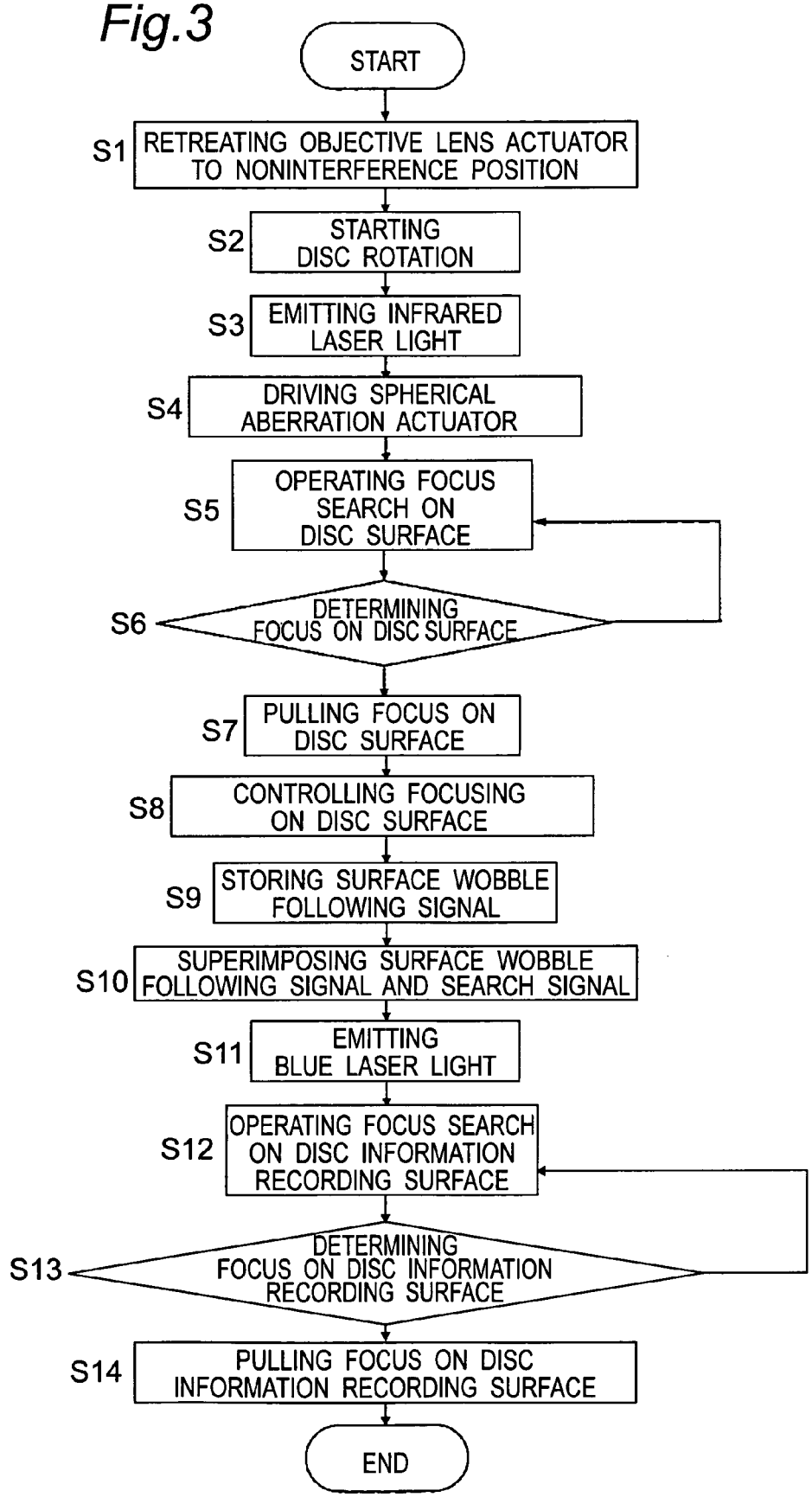
FIG. 3 is a flowchart exemplifying a sequence of a focus pull-in process of the optical disc apparatus according to Embodiment 1.
Figure 4A:
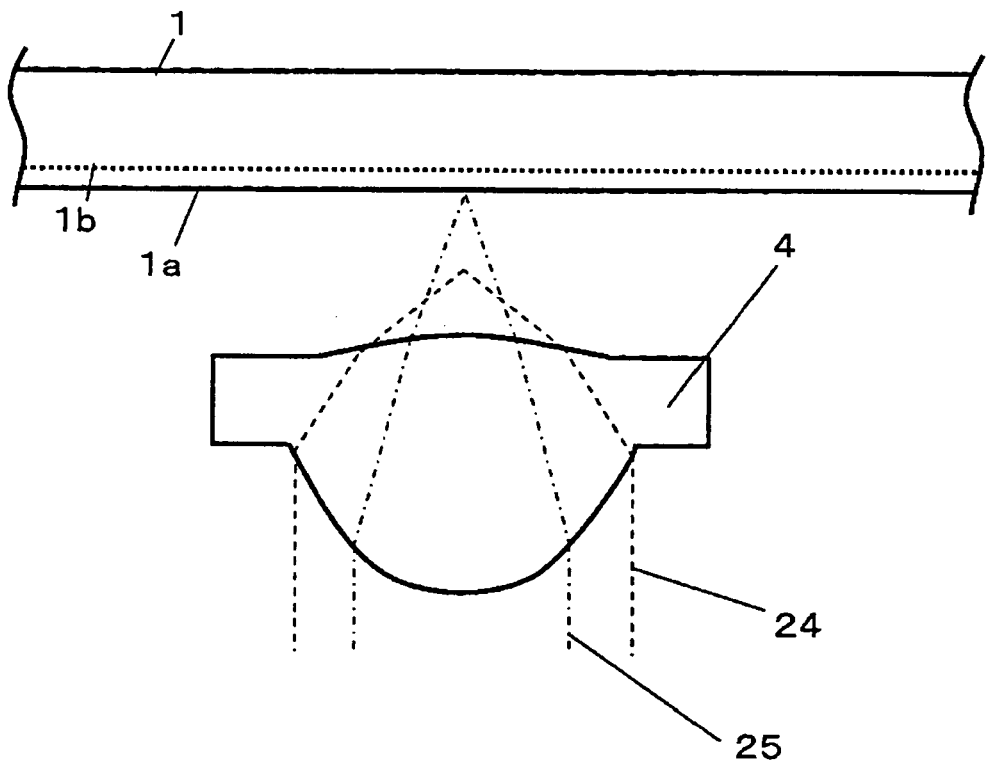
FIG. 4A is a schematic view showing the positional relation between an optical disc and an objective lens in a focus-servo state for a disc surface in the optical disc apparatus according to Embodiment 1.
Figure 4B:
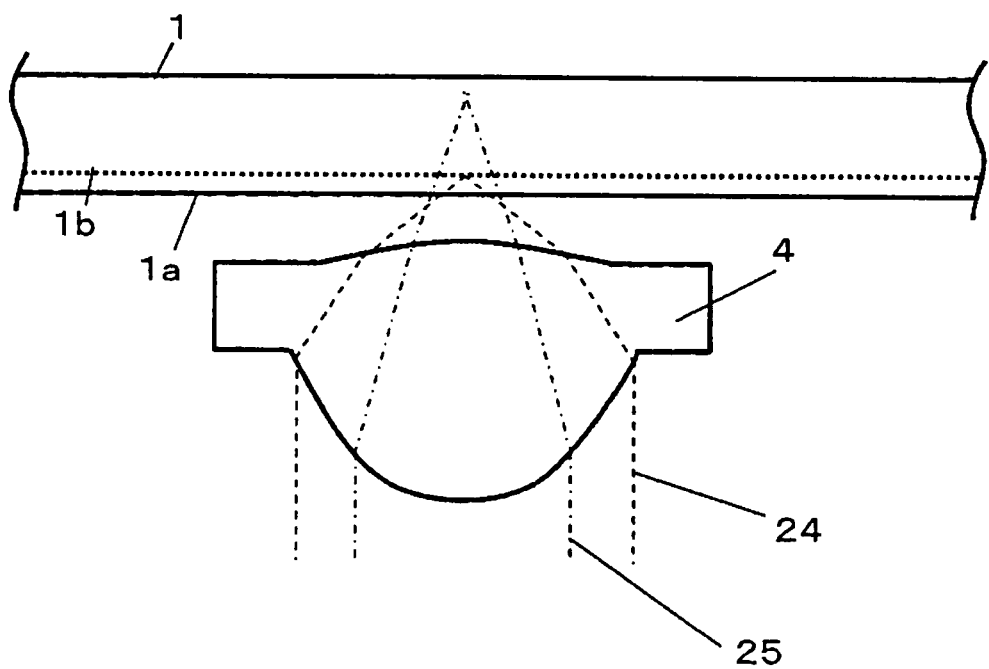
FIG. 4B is a schematic view showing the positional relation between the optical disc and the objective lens in the focus-servo state for a disc information recording surface in the optical disc apparatus according to Embodiment 1.
Figure 5:
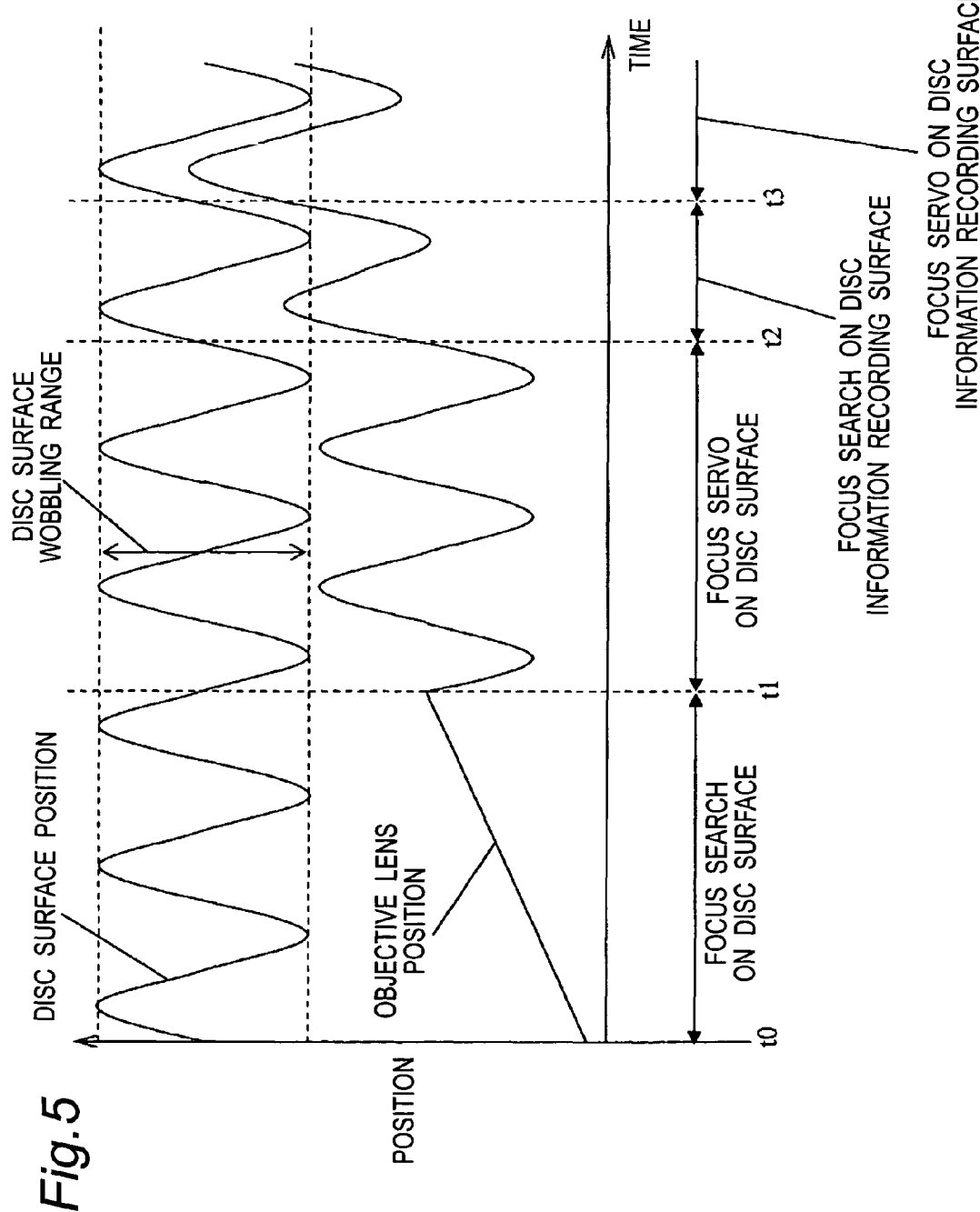
FIG. 5 is a time chart showing movement of the optical disc and the objective lens at the time of the focus pull-in according to Embodiment 1.

FIG. 1 is a block diagram showing a configuration of the optical disc apparatus according to Embodiment 1; FIG. 2 is a schematic view showing a configuration of an optical head device provided with the optical disc apparatus according to Embodiment 1; FIG. 3 is a flowchart exemplifying a sequence of the focus pull-in process of the optical disc apparatus according to Embodiment 1; FIG. 4A is a schematic view showing the positional relation between an optical disc and an objective lens in a focus-servo state for a disc surface in the optical disc apparatus according to Embodiment 1; FIG. 4B is a schematic view showing the positional relation between the optical disc and the objective lens in the focus-servo state for a disc information recording surface in the optical disc apparatus according to Embodiment 1; and FIG. 5 is a time chart showing movement of the optical disc and the objective lens at the time of the focus pull-in in the optical disc apparatus according to Embodiment 1.

As shown in FIG. 1, the optical disc apparatus of the present embodiment mainly includes: a spindle motor 2, an optical head device 3, an actuator driving circuit 8, an aberration correction actuator driving circuit 9, a spindle motor driving circuit 10, a focus error detection circuit 11, a focus control circuit 12, a surface wobble following signal storage device 13, a focus search driving signal generation circuit 14, a superimposition signal generation circuit 15, and a focus pull-in control circuit 16. Further, the optical head device 3 briefly has an objective lens 4, an optical system 5 including a light source and a photo detector, an objective lens actuator 6, and an aberration actuator 7.

Moreover, as shown in FIG. 1, a portion 50, including the focus error detection circuit 11, the focus control circuit 12, the surface wobble following signal storage device 13, the focus search driving signal generation circuit 14, the superimposition signal generation circuit 15 and the focus pull-in control circuit 16, is made of an integrated circuit and housed inside one chip in the present embodiment.

The optical disc apparatus of the present embodiment having the configuration as thus described is specifically described below.

In FIGS. 1 and 2, a disc 1 is an optical disc loaded on the optical disc apparatus of the present embodiment, having: a disc surface 1a downwardly chucked by the spindle motor 2; and an information recording surface 1b. The optical head device 3 is arranged under the disc 1 and converges and applies a light beam to the disc 1 via the objective lens 4. It is to be noted that in the present embodiment, the optical head device 3 has one objective lens 4.

Here, the optical head device 3 is described with reference to FIG. 2. The thickness of the substrate from the disc surface 1a to the information recording surface 1b of the disc 1 is called a substrate thickness. The optical head device 3 of the present embodiment is mounted with three kinds of laser light sources: blue light with a wavelength of 405 nm, red light with a wavelength of 650 nm, and infrared light with a wavelength of 780 nm, for corresponding to recording and reproduction of three kinds of the optical discs 1 respectively having substrate thicknesses of 0.1 mm, 0.6 mm and 1.2 mm. The objective lens 4 is compatibly designed so as to focus the light beams having the three kinds of wavelengths on the information recording surfaces 1b of the optical discs 1 having the respective substrate thicknesses.

First, focusing of a light beam of the blue light and detection of reflected light from the optical disc 1 are described.

Blue light beam 24 emitted from a blue laser 17 as the blue light source is reflected on a beam splitter 19 and a wedge beam splitter 20, and thereafter, the blue light beam 24 becomes parallel light through a collimator lens 21 mounted in the spherical aberration actuator 7, and is led by a mirror 22 to the objective lens 4. The objective lens 4 focuses the light beam 24 of the blue light, with for example a numerical aperture of 0.85, on the information recording surface 1b of the disc 1. The blue light beam 24 is reflected on the information recording surface 1b of the disc 1, again incident on the objective lens 4, reflected on the mirror 22, transmitted through the collimator lens 21, reflected on the wedge beam splitter 20, transmitted through the beam splitter 19, and incident on the photo detector 23. The photo detector 23 detects the applied light, converts the light into an electric signal, and outputs the signal to the focus error detection circuit 11.

Meanwhile, the red light source to emit the red laser light and the infrared light source to emit the infrared laser light are incorporated inside a two-wavelength unit 18. The infrared light beam 25 emitted from the two-wavelength unit 18 transmits through the wedge beam splitter 20, becomes parallel light through the collimator lens 21, and is led by the mirror 22 to the objective lens 4. Although the infrared light beam 25 is described here, the red light beam (not shown) travels the same light path. The objective lens 4 focuses the red light beam for example with a numerical aperture of 0.6, and the infrared light beam 25 for example with a numerical aperture of 0.45, on the information recording surface 1b of the disc 1. The light beam 25 is reflected on the information recording surface 1b, again incident on the objective lens 4, reflected on the mirror 22, transmits through the collimator lens 21, transmits through the wedge beam splitter 20, and is then incident on a photo detector incorporated in the two-wavelength unit 18. The photo detector inside the two-wavelength unit 18 detects the applied light, converts the light into an electric signal, and outputs the signal to the focus error detection circuit 11.

In the optical disc apparatus mounted with the optical head device 3 as described above, the objective lens actuator 6 drives the objective lens 4 in a vertical direction, i.e. a thickness direction of the mounted optical disc 1, by means of a driving signal from the actuator driving circuit 8, to position the focus of the light beam on the optical disc 1. Naturally, the objective lens actuator also drives the objective lens 4 in a diametrical direction of the optical disc 1 for tracking control. Further, the spherical aberration actuator 7 moves the collimator lens 21 in a direction of an arrow shown in the figure by the aberration correction actuator driving circuit 9, to correct the spherical aberration generated due to variations in substrate thickness of the disc 1 or the like at a focusing point of the objective lens 4.

The focus error detection circuit 11 detects an error amount from the focusing point based upon an S-shaped waveform of a focus error signal obtained by computing a signal from the optical head device 3 by means of reflected light reflected on the disc surface 1a or the disc information recording surface 1b, and outputs the detected amount.

The focus control circuit 12 outputs a control signal for controlling the objective lens actuator 6 to the actuator driving circuit 8 so as to eliminate the error amount based upon the focus error signal outputted from the focus error detection circuit 11.

When the infrared light beam 25 is focused on the disc surface 1a and the objective lens actuator 6 is in the focus-servo state, the surface wobble following signal storage device 13 monitors the driving signal of the actuator driving circuit 8, and stores the signal as a surface wobble following signal of the optical disc 1.

In search for the S-shaped waveform outputted from the focus error detection circuit 11, the focus search driving signal generation circuit 14 outputs a focus search driving signal that allows the objective lens 4 gradually approach the optical disc 1 from a position sufficiently apart from the surface wobble range of the disc 1.

The superimposition signal generation circuit 15 outputs a superimposition signal superimposed with the surface wobble following signal outputted from the surface wobble following signal storage device 13 and the focus search driving signal outputted from the focus search driving signal generation circuit 14.

When the optical disc 1 is the disc having the substrate thickness of 0.1 mm, the focus pull-in control circuit 16 makes the infrared laser light emit which has the longest focus distance of the objective lens 4 among the light sources with the three wavelengths so that the focus servo is pulled, i.e. focused, in the disc surface 1a of the disc 1. Subsequently, the blue laser 17 are emitted and the optical head device 3 is controlled such that the focus is pulled, i.e. achieved, in the information recording surface 1b of the disc 1 based upon the superimposition signal outputted from the superimposition signal generation circuit 15.

Next, the focus pull-in operation, i.e. the focusing operation, is described with reference to FIGS. 1 to 5.

First, when the optical disc 1 having the substrate thickness of 0.1 mm is loaded on the spindle motor 2, an objective lens retracting signal is outputted from the focus pull-in control circuit 16 to the actuator driving circuit 8, and the objective lens is retracted out of the surface wobbling range of the disc 1 (FIG. 3, Step S1). Thereafter, the spindle motor 2 is driven by the spindle motor driving circuit 10, and the optical disc 1 starts rotating (FIG. 3, Step S2).

Next, the infrared laser in the two-wavelength unit 18 emits light, and the infrared light beam 25 of the infrared light is emitted from the objective lens 4 to the optical disc 1 (FIG. 3, Step S3). Here, the focus pull-in control circuit outputs the focus search driving signal from the focus search driving signal generation circuit 14 to the actuator driving circuit 8, to drive the objective lens actuator 6 (FIG. 3 Step S5). This allows the objective lens 4 to gradually approach the optical disc 1, and the focus pull-in control circuit searches a focusing position of the infrared light beam 25 on the disc surface 1a of the disc 1 (FIG. 3, Step S6). At this time, the spherical aberration actuator 7 has moved the collimator lens 21 to a position for the case of the substrate having the smallest thickness in the movable range of the collimator lens 21 (FIG. 3, Step S4). Upon detection of the focusing position on the disc surface 1a by means of the focus error signal outputted from the focus error detection circuit 11, the focus pull-in control circuit 16 switches the drive of the objective lens actuator 6 to the focus control circuit 12 (FIG. 3, Step S7), and allows the focus control circuit 12 to pull the focus servo on the disc surface 1a of the disc 1 (FIG. 3, Step S8).

At this time, the relative positional relation between the disc 1 and the objective lens 4 is as shown in FIG. 4A, and the infrared light beam 25 with the longest focus distance is focused on the disc surface 1a of the optical disc 1. Therefore, since the focus distance is not shorter than 2 mm, the relative distance between the disc 1 and the objective lens 4 is also not shorter than 2 mm, which is sufficiently longer than the surface wobbling range of the disc 1. Hence the disc 1 and the objective lens 4 do not collide at the time of the pull-in.

Here, the surface wobble following signal storage device 13 monitors the driving signal of the actuator driving circuit 8 and associates it with the driving signal of the spindle motor driving circuit 10, to store the obtained signal as the surface wobble following signal of the optical disc 1 (FIG. 3, Step S9). As a storage medium, for example, a semiconductor memory or the like is used.

The superimposition signal generation circuit 15 then outputs to the focus pull-in control circuit 16 the superimposition signal superimposed with the surface wobble following signal outputted from the surface wobble following signal storage device 13 and the focus search driving signal outputted from the focus search driving signal generation circuit 14 (FIG. 3, Step S10).

The focus pull-in control circuit 16 allows the blue laser 17 to emit light in place of the infrared light beam 25 in accordance with the supply of the superimposition signal (FIG. 3, Step S11), and outputs the superimposition signal outputted from the superimposition signal generation circuit 15 to the actuator driving circuit 8, to search a focusing position of the blue light beam 24 on the information recording surface 1b of the disc 1 (FIG. 3, Steps S12 and 13). At this time, the spherical aberration actuator 7 has moved the collimator lens 21 to a position supporting correction of the spherical aberration corresponding to a substrate thickness of 0.1 mm.

At the time of detecting the focusing position on the information recording surface 1b by means of the focus error signal outputted from the focus error detection circuit 11, the focus pull-in control circuit 16 switches the driving control of the objective lens actuator 6 to the focus control circuit 12 (FIG. 3, Step S14). The focus control circuit 12 pulls the focus servo on the information recording surface 1b of the disc 1, to complete the focus pull-in operation.

At this time, the relative positional relation between the disc 1 and the objective lens 4 is formed as shown in FIG. 4B, where the blue light beam 24 is focused on the information recording surface 1b of the disc 1. Therefore, although the WD is as short as, for example, 0.3 mm, the relative distance between the objective lens 4 and the optical disc 1 is gradually shortened, while the objective lens 4 vibrates in synchronism with the surface wobble of the optical disc 1, to perform the focus pull-in and hence the disc 1 and the objective lens 4 do not collide at the time of the focus pull-in.

The relative distance between the disc 1 and the objective lens 4 in the foregoing focus pull-in operation is described with reference to FIG. 5.

In FIG. 5, first, the focus pull-in operation is started at time t0, and by the focus search operation on the disc surface 1a of the disc 1, the objective lens 4 gradually approaches the optical disc 1. At time t1, the focusing position of the infrared light beam 25 on the disc surface 1a of the disc 1 is detected, and the focus servo on the disc surface 1a of the disc 1 is started. At this time, the objective lens 4 is located out of the surface wobbling range of the disc 1 as described above so as to ensure the safety against the collision.

Next, the objective lens 4 gradually shortens the relative distance between the objective lens 4 and the optical disc 1, while vibrating in synchronism with the surface wobble of the optical disc 1 by means of the superimposition signal, to perform the focus pull-in for the disc surface of the disc. Hence the disc 1 and the objective lens 4 do not collide at the time of the focus pull-in.

At time t3, the focusing position of the blue light beam 24 on the information recording surface 1b of the disc 1 is detected, and the focus pull-in control circuit 16 switches the drive control of the objective lens actuator 6 to the focus control circuit 12, and the focus control circuit 12 performs the focus servo on the information recording surface 1b of the disc 1, to complete the focus pull-in operation.

As thus described, according to Embodiment 1 of the present invention, when a focus is pulled in the information recording surface 1b of the disc 1, the focus servo is first pulled in the disc surface 1a of the disc 1. Then the surface wobble following signal as a driving signal necessary for following the surface wobble is stored with the focus-servo on the disc surface 1a settled state. Then, based upon the signal superimposed with this surface wobble following signal and the focus search driving signal, the focus is pulled in the information recording surface 1b of the disc 1.

Therefore, in the present embodiment, since the focus-servo is pulled in the disc surface 1a of the disc 1 by means of a light beam for reading or writing information to detect vertical movement of the optical disc 1 due to the surface wobble thereof, there is no need to separately provide a non-contact sensor, thus preventing an increase in cost caused by added components.

Further, since the light beam that detects the vertical movement of the disc 1 due to the surface wobble thereof is emitted from the objective lens 4 as it is, a surface wobbling amount detection error is not generated and thereby, naturally, the phase displacement caused by the surface wobble is not generated.

Moreover, since detection of the distance from the optical disc 1 by means of the light beam for reading or writing information is performed with accuracy by the focus error detecting means mounted in the optical disc apparatus, the surface wobbling amount detection error is not generated.

Next, after the focus-servo state is pulled in the disc surface 1a, the driving signal for following the surface wobble is stored, and based upon the signal superimposed with this surface wobble following signal and the focus search driving signal, the focus search operation is performed on the information recording surface 1b of the optical disc. Therefore, the relative speed of the objective lens 4 and the information recording surface 1b corresponds only to the amount of the focus search operation except for the amount of vertical variation of the optical disc 1 due to the surface wobble thereof. Hence the rushing speed does not exceed the rushing speed limit at the time of the focus pull-in.

Consequently, the objective lens 4 and the disc 1 do not collide in the focus pull-in operation, and no damage is thus inflicted to the disc 1 and the objective lens 4. It is thereby possible to realize the optical disc apparatus with high reliability and further, low cost.

Moreover, at the time of once pulling the focus on the disc surface 1a of the disc 1 having a substrate thickness of 0.1 mm corresponding to the blue light beam 24, the focus servo is performed using the infrared light beam 25. Therefore, the infrared light beam 25 has the longest focus distance of the objective lens 4 among the three kinds of light beams compatibly used by the optical head device 3, and due to such a long focus distance, the distance from the disc 1 to the objective lens 4 is sufficiently apart from the range of the vertical movement of the disc 1 due to the surface wobble thereof. It is thereby possible to further eliminate the possibility for the collision of the objective lens 4 and the disc 1 at the time of pulling the focus on the information recording surface 1b.

Further, since the spherical aberration actuator 7 has moved the collimator lens 21 to a position for the case of the substrate having the smallest thickness in the movable range of the collimator lens 21, it is possible to suppress displacement of the focus error signal, caused by spherical aberration corresponding to a substrate thickness of 1.2 mm, to the minimum so as to stably pull the focus as well as the focus servo on the disc surface 1a. Then, at the time of pulling the focus on the information recording surface 1b, the spherical aberration actuator 7 has moved the collimator lens 21 to a position supporting correction of the spherical aberration corresponding to a substrate thickness of 0.1 mm. Thus it is possible to perform the focus pull-in stably.

Further, at the time of pulling the focus on the disc surface 1a, instead of previously driving the spherical aberration actuator 7, the focus may be pulled in a position set by previously correcting focus displacement generated due to spherical aberration corresponding to a substrate thickness of 1.2 mm.

In the present embodiment, the focus servo is once pulled in the disc surface by means of the infrared light, using the objective lens corresponding to three kinds of wavelengths, and thereafter, the focus is pulled in the information recording surface by means of the blue light. However, the focus servo may be once pulled in the disc surface, using the objective lens corresponding to two kinds of wavelengths or one kind of wavelength and by means of the light source for a longer wavelength in the case of the two kinds of wavelengths and the light source for one wavelength in the case of the one kind of wavelength, and therefore, the objective lens is not limited to the present embodiment.

Moreover, although the focus pull-in control circuit is arranged to control the focus pull-in operation in the present embodiment, a controller having the same function may be provided, and for example, part of a system controller may have the same function.

Embodiment 2

In the following, an optical disc apparatus according to Embodiment 2 of the present invention is described with reference to the drawings.

Figure 6:
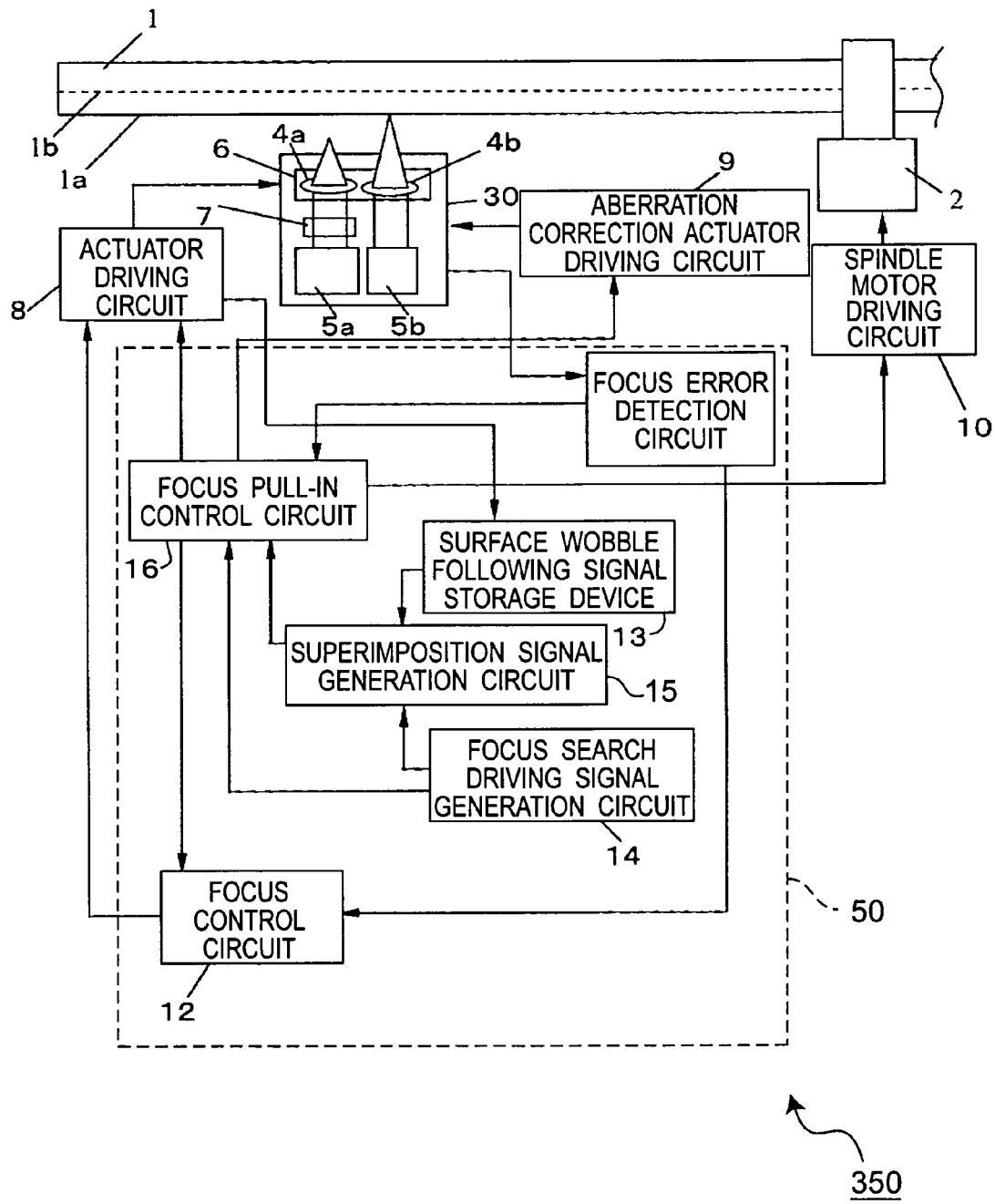
FIG. 6 is a block diagram showing a configuration of an optical disc apparatus according to Embodiment 2.
Figure 7:
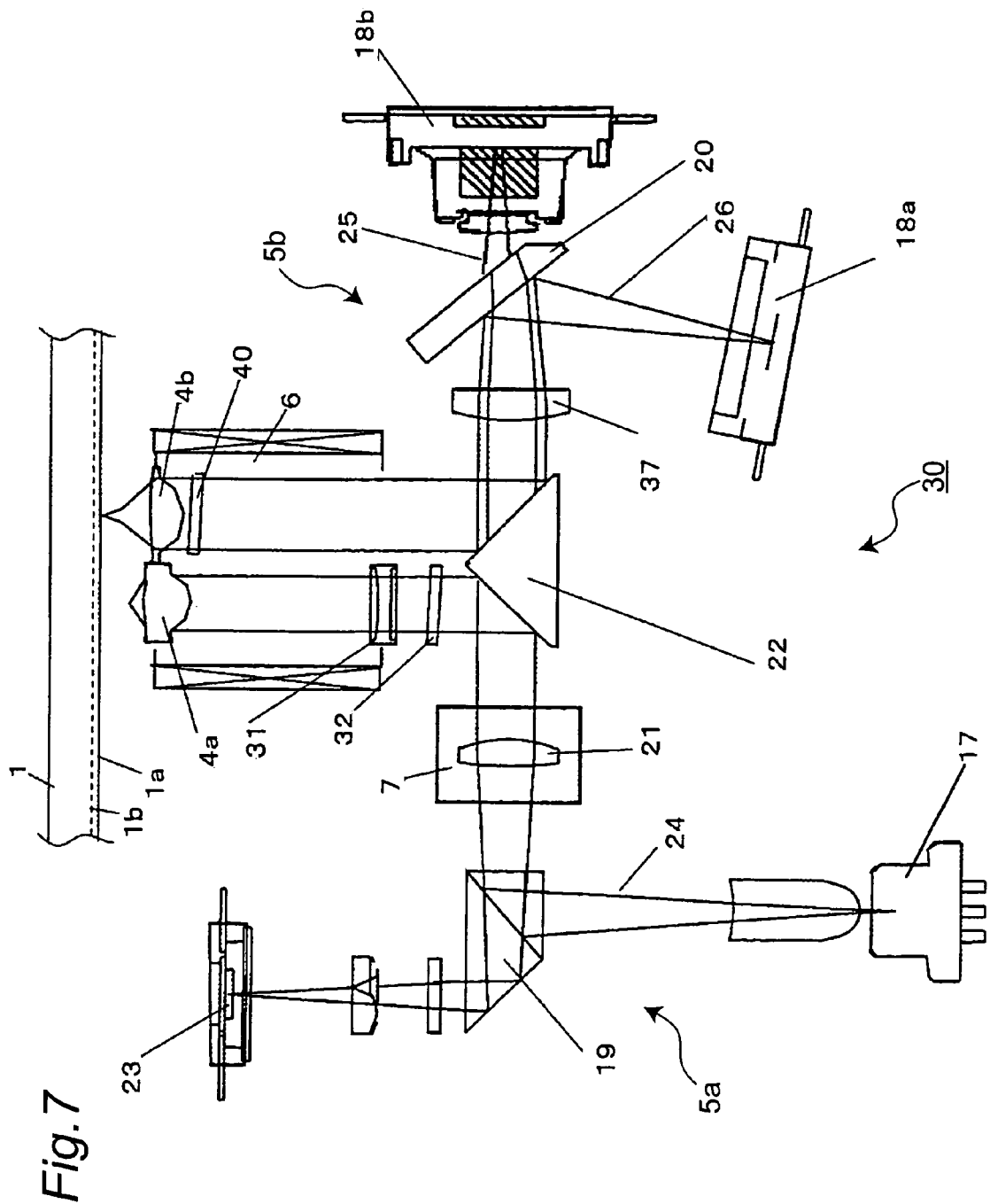
FIG. 7 is a schematic view showing a configuration of an optical head device in the optical disc apparatus according to Embodiment 2.
Figure 8:
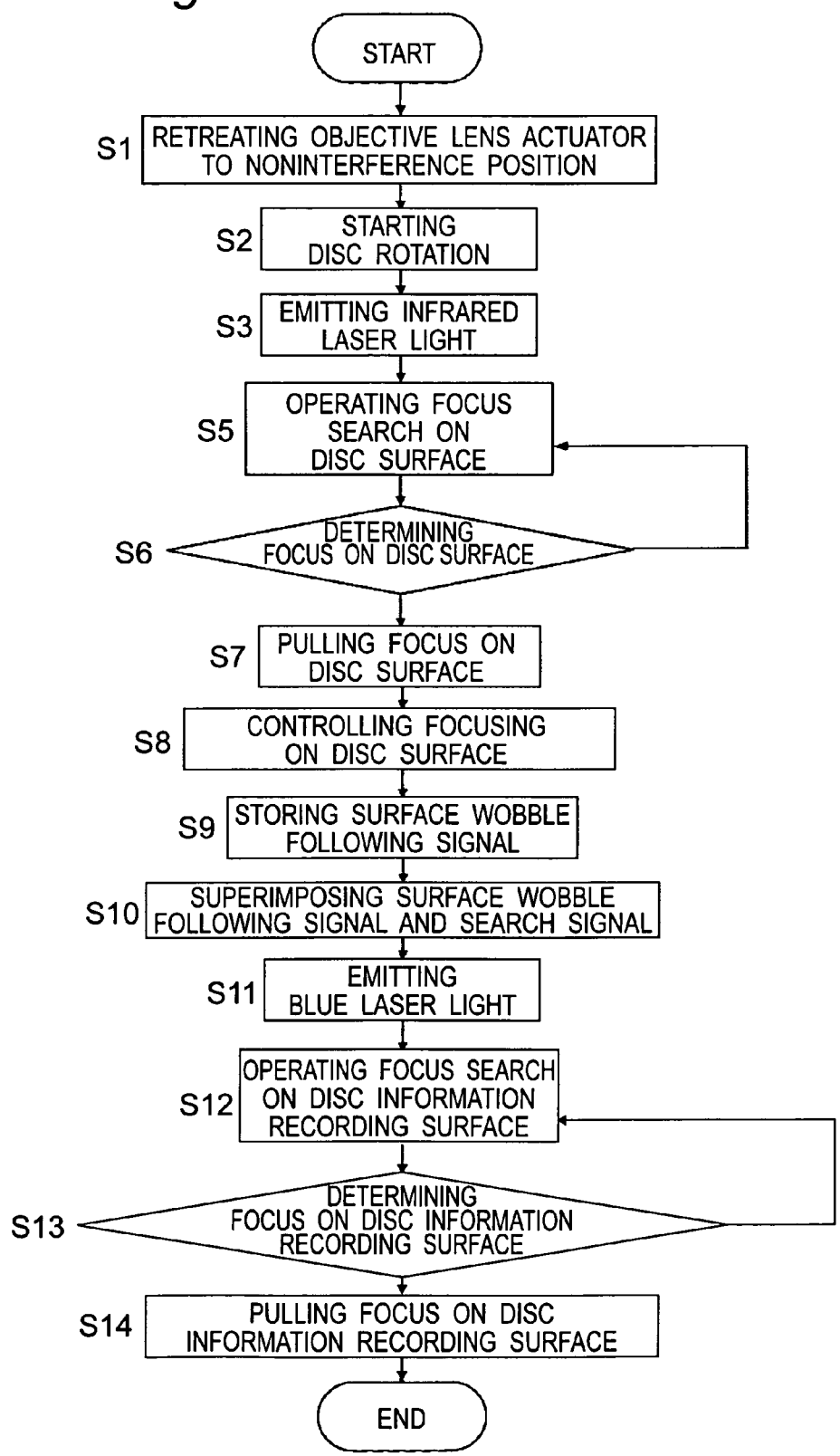
FIG. 8 is a flowchart exemplifying a sequence of the focus pull-in process of the optical disc apparatus according to Embodiment 2.
Figure 9A:
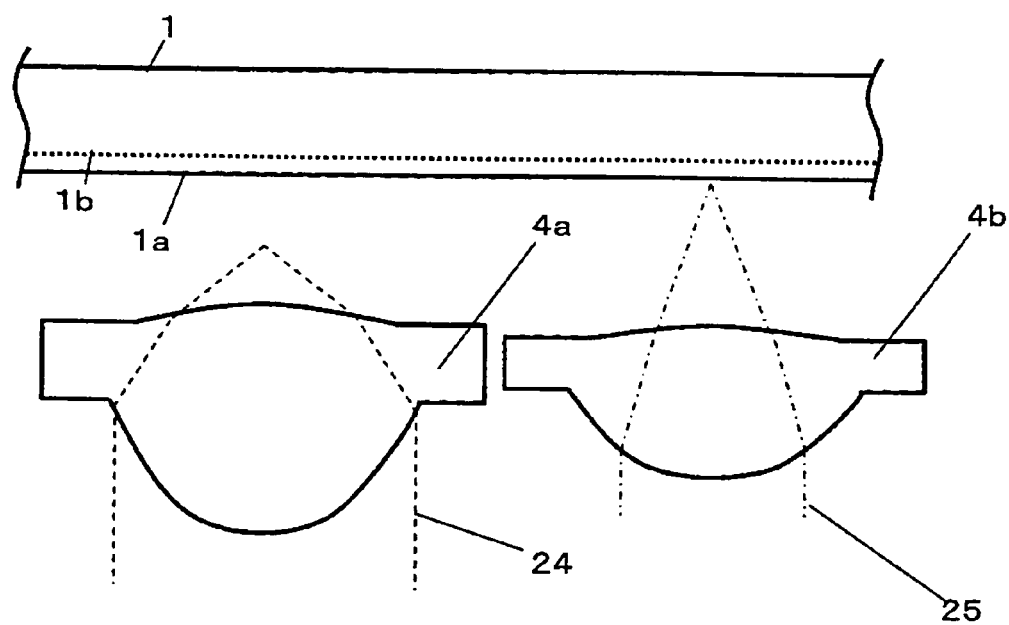
FIG. 9A is a schematic view showing the positional relation between an optical disc and objective lenses in the focus-servo state for a disc surface in the optical disc apparatus according to Embodiment 2.
Figure 9B:
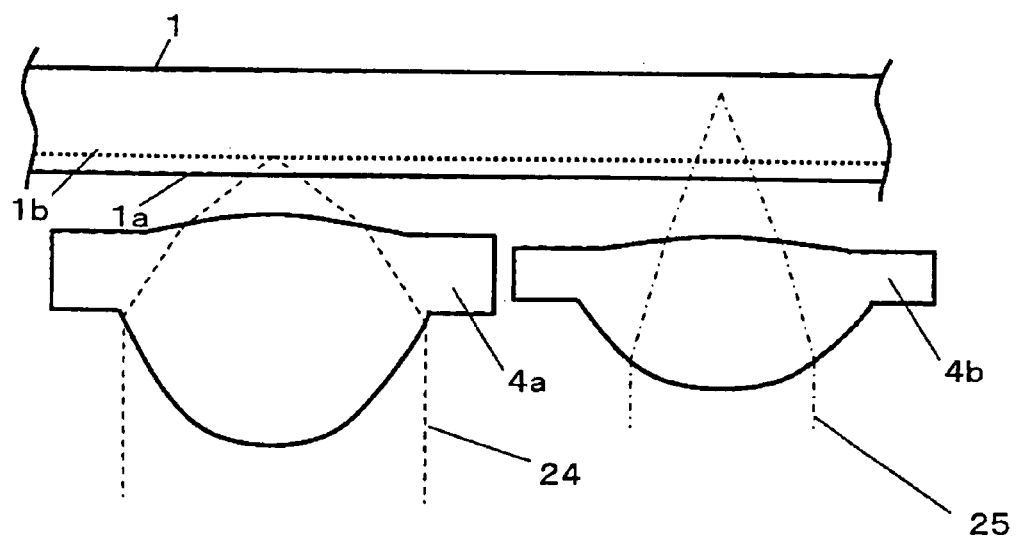
FIG. 9B is a schematic view showing the positional relation between the optical disc and the objective lenses in the focus-servo state for a disc information recording surface in the optical disc apparatus according to Embodiment 2.

FIG. 6 is a block diagram showing a configuration of the optical disc apparatus according to Embodiment 2; FIG. 7 is a schematic view showing a configuration of an optical head device in the optical disc apparatus according to Embodiment 2; FIG. 8 is a flowchart exemplifying a sequence of a pull-in process of the optical disc apparatus according to Embodiment 2; FIG. 9A is a schematic view showing the positional relation between an optical disc and objective lenses with a disc surface in the focus-servo state in the optical disc apparatus according to Embodiment 2; FIG. 9B is a schematic view showing the positional relation between the optical disc and the objective lenses with a disc information recording surface in the focus-servo state in the optical disc apparatus according to Embodiment 2.

FIG. 6 differs from FIG. 1 in that, as for the configuration of the optical head device, the optical head device 3 including the objective lens 4 has been replaced by an optical head device 30 including two objective lenses 4a and 4b and optical systems 5a and 5b corresponding to the respective objective lenses 4a and 4b. Other configurations of FIG. 6 are the same as those shown in FIG. 1, and the components having the same function are provided with the same numerals.

Therefore, here, only the optical head device 30 is described with reference to FIG. 7.

The optical head device 30 of the present embodiment is mounted with three kinds of laser light sources: blue light with a wavelength of 405 nm, red light with a wavelength of 650 nm, and infrared light with a wavelength of 780 nm, for corresponding to recording and reproduction of three kinds of the optical discs respectively having substrate thicknesses of 0.1 mm, 0.6 mm and 1.2 mm. The objective lens 4a corresponds only to the blue light beam, and is designed so as to focus the light beam on the information recording surface 1b of the optical disc 1 having a substrate thickness of 0.1 mm. The objective lens 4b is compatibly designed so as to focus the light beams having two kinds of wavelengths, red beams and infrared beams, on the information recording surface 1b of the optical discs 1 having substrate thicknesses of 0.6 mm and 1.2 mm.

First, gathering of a light beam of the blue light and detection of reflected light from the optical disc are described.

Blue light beam 24 emitted from the blue laser 17 as the blue light source is reflected on the beam splitter 19, and thereafter, becomes parallel light through a collimator lens 21 mounted in the spherical aberration actuator 7, and is led to the objective lens 4a by a mirror 22. The objective lens 4a focuses the light beam 24 of the blue light on the information recording surface 1b of the disc 1, for example with a numerical aperture of 0.85. The blue light beam 24 is reflected on the information recording surface 1b of the disc 1, again incident on the objective lens 4a, reflected on the mirror 22, transmitted through the collimator lens 21, reflected on the beam splitter 19, and incident on the photo detector 23. The photo detector 23 detects the applied light, converts the light into an electric signal, and outputs the signal to the focus error detection circuit 11.

Meanwhile, the infrared light source to emit infrared laser light is incorporated in an infrared unit 18b. The infrared light beam 25 emitted from the infrared unit 18b transmits through the wedge beam splitter 20, becomes parallel light through the collimator lens 37, and is led to the objective lens 4b by the mirror 22. The objective lens 4b focuses the infrared light beam 25 on the information recording surface 1b of the disc 1 for example with a numerical aperture of 0.45. The light beam 25 is reflected on the information recording surface 1b, incident on the objective lens 4b, reflected on the mirror 22, transmitted through the collimator lens 21, transmitted through the wedge beam splitter 20, and then incident on the photo detector incorporated in the infrared unit 18b. The photo detector detects the applied light, converts the light into an electric signal, and outputs the signal to the focus error detection circuit 11.

The red light source to emit red laser light is incorporated in a red unit 18a. The red light beam 26 emitted from the red unit 18a is reflected on the wedge beam splitter 20, and thereafter travels the same light path as that of the infrared light beam 25, again reflected on the wedge beam splitter 20, and then incident on a photo detector incorporated in the red unit 18a. The photo detector detects the applied light, converts the light into an electric signal, and outputs the signal to the focus error detection circuit 11.

In the optical disc apparatus mounted with the optical head device 30 as described above, the objective lens actuator 6 drives the objective lenses 4a and 4b in the vertical direction by means of a driving signal from the actuator driving circuit 8, to position the focus of the light beam on the optical disc 1. Further, the spherical aberration actuator 7 moves the collimator lens 21 via the aberration correction actuator driving circuit 9, to correct the spherical aberration generated due to variations in substrate thickness of the disc 1 or the like at a point focused by the objective lens 4a.

Next, the focus pull-in operation is described with reference to FIGS. 8, 9A and 9B. FIG. 8 differs from FIG. 3 in that, since the light paths of the blue light beam and the infrared beam are separated, the process of moving the collimator lens 21 by the spherical aberration actuator, namely Step S4 shown in FIG. 3, has been eliminated. FIGS. 9A and 9B differ from FIGS. 4A and 4B in that the two objective lenses 4a and 4b are provided in place of the objective lens 4.

It is to be noted that the operation shown in FIG. 8 is the same as that shown in FIG. 3 except for elimination of Step S4. Therefore, the description of the focus pull-in operation on the disc surface 1a and the information recording surface 1b of the disc 1 in the optical disc apparatus of Embodiment 2 is omitted here.

Accordingly, the relative positional relation between the disc 1 and the objective lenses 4a/4b with the infrared light beam 25 focused on the disc surface 1a of the disc 1 and the relative positional relation between the disc 1 and the objective lenses 4a/4b with the blue light beam 24 focused on the information recording surface 1b of the disc 1 are described with reference to FIGS. 9A and 9B.

When the infrared light beam 25 is focused on the disc surface 1a of the disc 1 and the focus servo is performed, the relative positional relation between the disc 1 and the objective lenses 4a/4b is as shown in FIG. 9A, where the infrared light beam 25 with the longest focus distance is focused on the disc surface 1a of the disc 1 by the objective lens 4b. The relative distance between the disc 1 and the objective lenses 4a/4b is not shorter than 2 mm, which is sufficiently longer than the surface wobbling range of the disc 1. Hence the disc 1 and the objective lenses 4a/4b do not collide at the time of pulling the focus on the disc surface 1a.

Further, when the blue light beam 24 is focused on the information recording surface 1b of the disc 1 and the focus servo is performed, the relative positional relation between the disc 1 and the objective lenses 4a/4b is as shown in FIG. 9B. Although the WD is as short as, for example, 0.3 mm, each of the objective lenses 4a and 4b gradually shortens the relative distance from the optical disc 1, while vibrating in synchronism with the surface wobble of the optical disc 1, to perform the focus pull-in. Hence the disc 1 and the objective lenses 4a/4b do not collide at the time of pulling the focus on the information recording surface 1b.

As thus described, in Embodiment 2 of the present invention, at the time of pulling a focus servo on a record-type optical disc apparatus mounted with an optical head device where a plurality of objective lenses suited for a record-type optical head device required to have higher reliability are installed in an objective lens actuator, the possibility for collision between the objective lens and the optical disc can be reduced, thereby enhancing reliability of the device so as to enhance salability of the product.

Figure 10:
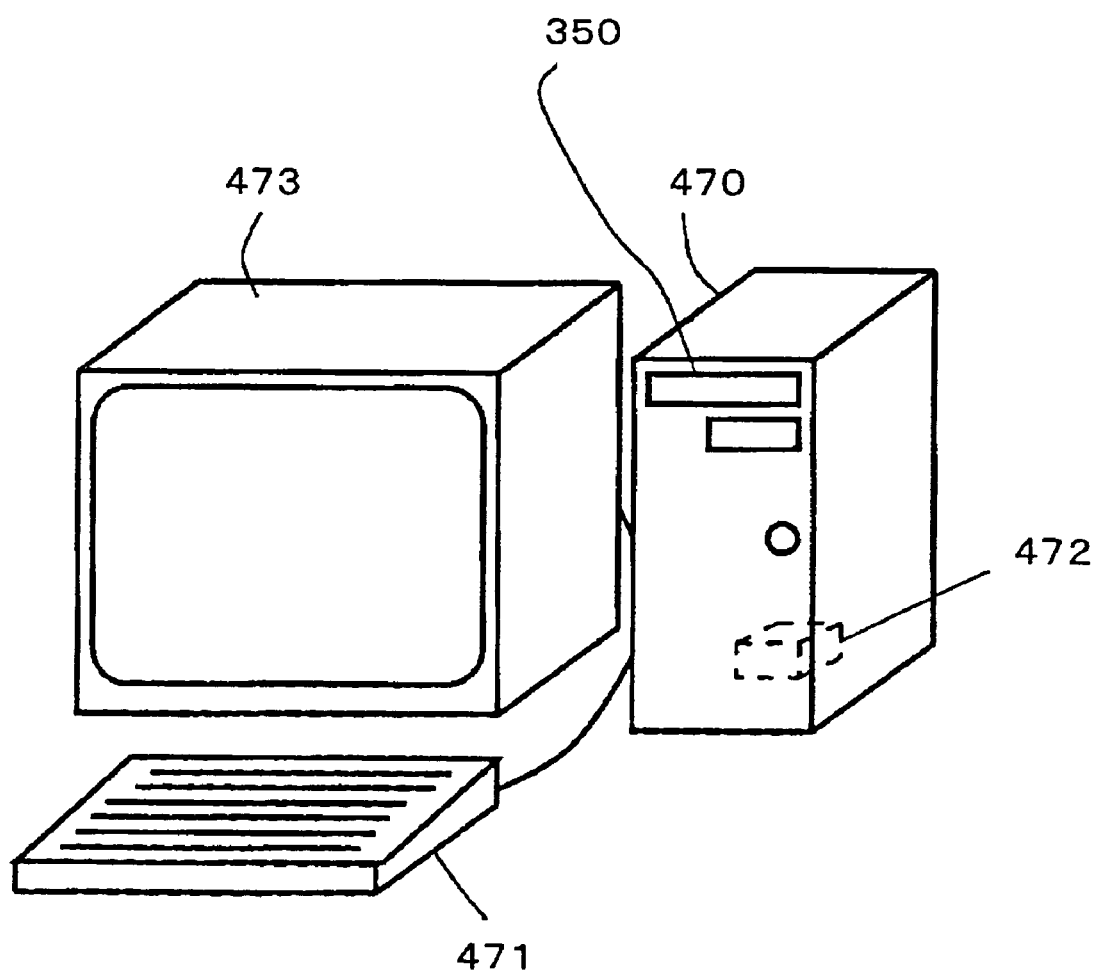
FIG. 10 is a schematic view showing a configuration of a computer mounted with the optical disc apparatus of FIG. 1 or 6.

Moreover, the optical disc apparatuses illustrated in FIGS. 1 and 6 can be mounted in a variety of apparatuses. A computer, an optical disc player and an optical disc recorder as optical information equipment mounted with the optical disc apparatus illustrated in FIG. 1 or 6 allow stable recording or reproduction of optical discs of different kinds, and thus can be used for a wide range of applications. FIG. 10 is a schematic view showing a configuration of a computer mounted with the optical disc apparatus of FIG. 1 or 6.

FIG. 10 is a constitutional example of a computer 470 as one example of optical information equipment. In FIG. 10, the computer 470 is configured including: the optical disc apparatus 350 illustrated in FIG. 1 or 6; an input device 471 such as a keyboard, a mouse or touch panel for inputting information; a computing device 472 such as a central processing unit (CPU) that performs computing based upon information read from the optical disc apparatus 350; and an output device 473 such as a cathode-ray tube, a liquid crystal display device or a printer that displays information such as a result of calculation by the processing unit.

Further, the computer 470 may be mounted with a wired or wireless input/output terminal that downloads information to be recorded in the disc 1 loaded on the optical disc apparatus 350 or outputs information read by the optical disc apparatus 350 to the outside. Thereby, the optical disc apparatus 350 can be used as an information server (optical disc server) that exchanges information with a plurality of equipment such as a computer, a telephone and a TV tuner and is shared by those plurality of devices. The optical disc apparatus 350 has the effect of being used in a wide range of applications since being capable of stably recording and reproducing optical discs of different kinds.

Further, by providing a changer capable of inserting and ejecting a plurality of optical discs into and from the optical disc apparatus 350, the effect of recording and storing a large amount of information can be obtained.

Figure 11A:
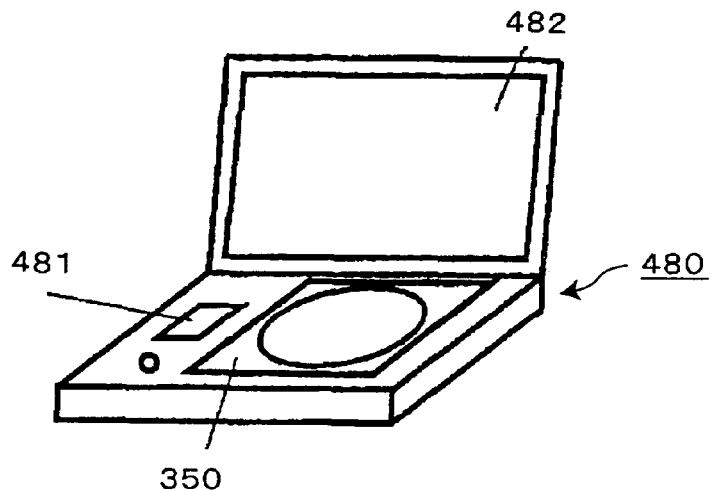
FIG. 11A is a view showing a schematic configuration of an optical disc player mounted with the optical disc apparatus shown in FIG. 1 or 6.

Moreover, FIG. 11A shows a schematic configuration of an optical disc player 480 as one example of optical information equipment mounted with the optical disc apparatus 350 illustrated in FIG. 1 or 6. In FIG. 11A, an optical disc player 480 is configured having the optical disc apparatus 350 and an information-to-image conversion device (e.g. a decoder 481) that converts an information signal obtained from the optical disc apparatus 350 into an image. Further, the present configuration can also be utilized as a car navigation system. Moreover, it may be a configuration added with a display device 482 such as a liquid crystal monitor.

Figure 11B:
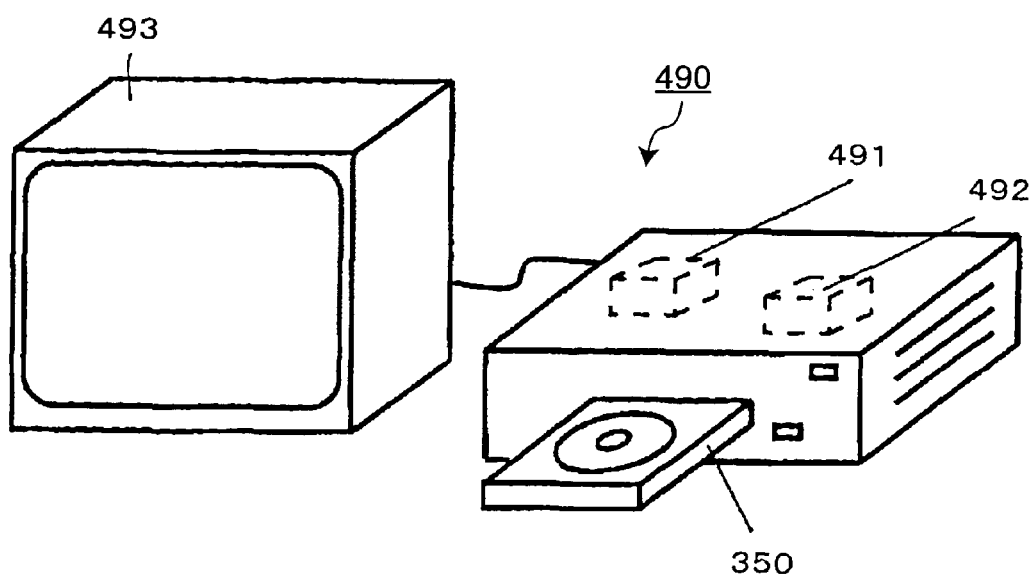
FIG. 11B is a view showing a schematic configuration of an optical disc recorder mounted with the optical disc apparatus shown in FIG. 1 or 6.

FIG. 11B shows a schematic configuration of an optical disc recorder 490 as one example of optical information equipment mounted with the optical disc apparatus 350 illustrated in FIG. 1 or 6. In FIG. 11B, an optical disc recorder 490 is configured having the optical disc apparatus 350 illustrated in FIG. 1 or 6, and an image-to-information conversion device (e.g. an encoder 492) that converts image into information to be recorded in an optical disc by the optical disc apparatus 350. Desirably, an information-to-image conversion device (a decoder 491) that converts an information signal obtained from the optical disc apparatus 350 into an image is also mounted so that an already recorded portion can be reproduced. An output device 493 such as a cathode-ray tube or a liquid crystal display device that displays information may be provided.

It is to be noted that, although the output device is shown in the foregoing equipment using the optical disc apparatus illustrated in FIG. 1 or 6, it goes without saying that a product pattern can be formed such that an output terminal is mounted in these apparatuses and the output device is thus configured separately. Further, although an input device is not shown in the aforesaid apparatuses, a product pattern comprising an input device such as a keyboard, a touch panel, a mouse or a remote control device can be formed, or only an input terminal can be mounted so that an input device is separately configured.

The optical disc apparatus according to the present invention is capable of performing recording and reproduction on a plurality of kinds of optical discs having different substrate thicknesses, corresponding wavelengths, recording densities, and the like. Further, by using this optical disc apparatus, it is possible to handle optical discs of lots of standards, such as a CD, a DVD and a BD. Therefore, the optical disc apparatus can be applied and developed to any system for recording and reproducing information, such as a computer, an optical disc player, an optical disc recorder, a car navigation system, an edit system, an optical disc sever, and an AV component.

It is to be noted that appropriately combining arbitrary embodiments out of the above-mentioned variety of embodiments enables exertion of respective effects of the combined embodiments.

While the present invention was sufficiently described in association with preferred embodiments with reference to the attached documents, a variety of modifications and corrections are apparent for the skilled in the art. It should therefore be understood that such modifications and changes are included in the present invention so long as not departing from the scope of the present invention set by the attached claims.

Further, the disclosed contents of the specification, drawings, claims and abstract of Japanese Patent Application No. 2006-349168, filed on Dec. 26, 2006, are all incorporated as references into the present specification.

What is claimed is:

1. An optical disc apparatus, comprising:
   an optical head device comprising an objective lens and an objective lens actuator for moving the objective lens at least in a vertical direction to an optical disc, and configured to converge and apply a light beam to the optical disc via the objective lens by moving the objective lens;
   a focus error detection circuit configured to generate a focus error signal in accordance with positional displacement of a focus of the light beam with respect to a light incidence surface of the optical disc or an information recording surface of the optical disc;
   a focus control circuit configured to control the objective lens actuator based upon the focus error signal generated by the focus error detection circuit to allow the focus position of the light beam to follow the light incidence surface or the information recording surface;
   a surface-wobble-following signal storage device configured to store a surface-wobble-following signal as a driving signal that is applied to the objective lens actuator when the focus position is allowed to follow the light incidence surface of the optical disc;
   a focus-search-driving signal generation circuit configured to generate a focus-search-driving signal as a driving signal for changing the focus position of the light beam with respect to the optical disc;

a superimposition signal generation circuit configured to generate a signal superimposed with the surface-wobble-following signal stored in the surface-wobble-following signal storage device and the focus-search-driving signal generated by the focus-search-driving signal generation circuit; and a focusing control circuit configured to control the objective lens actuator based upon the superimposition signal generated by the superimposition signal generation circuit and achieve a focus on the information recording surface of the optical disc in a state that the focus control circuit achieves a focus servo on the light incidence surface of the optical disc and the surface-wobble-following signal storage device stores the surface-wobble-following signal.

2. The optical disc apparatus according to claim 1, wherein the optical head device includes a light source that emits light beams with a plurality of wavelengths respectively corresponding to reproduction of a plurality of kinds of optical discs, and the focusing control circuit achieves the focus servo on the light incidence surface of the optical disc by using a light beam with a focus distance longer than a focus distance in a light beam corresponding to the optical disc with respect to which recording and reproduction are performed, among the plurality of light beams.

3. The optical disc apparatus according to claim 1, wherein the optical head device comprises: a light source that emits light beams with a plurality of wavelengths respectively corresponding to reproduction of a plurality of kinds of optical discs; and a plurality of objective lenses, and the focusing control circuit achieves the focus servo on the light incidence surface of the optical disc by using an objective lens from among the plurality of objective lenses in combination with the light source that together generate a light beam with a focus distance longer than a focus distance of a combination of the objective lens among the plurality of objective lenses and the light source that together are used correspondingly with the optical disc with respect to which recording and reproduction are performed.

4. The optical disc apparatus according to claim 2, wherein the light source is a light source that emits red light or infrared light.

5. The optical disc apparatus according to claim 2, wherein the focus distance of the objective lens through which the light beam with the longer focus distance of the objective lens passes is longer than a surface wobbling amount of the optical disc with respect to which recording and reproduction are performed.

6. The optical disc apparatus according to claim 1, wherein at the time of achieving the focus servo on the light incidence surface of the optical disc, the focusing control circuit achieves the focus servo on a position where focus displacement due to spherical aberration corresponding to a substrate thickness of the optical disc is previously corrected.

7. The optical disc apparatus according to claim 1, further comprising a collimator lens and a spherical aberration correction actuator configured to move the collimator lens so as to correct spherical aberration generated due to a change in thickness of the optical disc, wherein the focusing control circuit previously arranges the collimator lens to a correction position for the case of the substrate having the smallest thickness, at the time of achieving the focus servo on the light incidence surface of the optical disc.

8. The optical disc apparatus according to claim 2, wherein the focusing control circuit, in the state that the focus control circuit achieves a focus servo on the light incidence surface, is configured to achieve the focus on the information recording surface by using a light beam corresponding to the optical disc with respect to which recording and reproduction are performed.

9. The optical disc apparatus according to claim 3, wherein the focusing control circuit, in the state that the focus control circuit achieves a focus servo on the light incidence surface, is configured to achieve the focus on the information recording surface by using a light beam corresponding to the optical disc with respect to which recording and reproduction are performed.

10. The optical disc apparatus according to claim 1, wherein the optical head device includes a plurality of light sources that emit a plurality of light beams with different wavelengths respectively corresponding to reproduction of a plurality of kinds of optical discs, and the focusing control circuit achieves the focus servo on the light incidence surface of the optical disc by using a light beam with a focus distance longer than a focus distance in a light beam corresponding to the optical disc with respect to which recording and reproduction are performed, among the plurality of light beams.

11. The optical disc apparatus according to claim 10, wherein the light source that emits the light beam with the longer focus distance is a light source that emits red light or infrared light.

12. The optical disc apparatus according to claim 10, wherein the focus distance of the objective lens through which the light beam with the longer focus distance of the objective lens passes is longer than a surface wobbling amount of the optical disc with respect to which recording and reproduction are performed.

13. The optical disc apparatus according to claim 10, wherein the focusing control circuit, in the state that the focus control circuit achieves a focus servo on the light incidence surface, is configured to achieve the focus on the information recording surface by using a light beam corresponding to the optical disc with respect to which recording and reproduction are performed.

14. The optical disc apparatus according to claim 1, wherein the optical head device comprises: a plurality of light sources that emit light beams with a plurality of wavelengths respectively corresponding to reproduction of a plurality of kinds of optical discs; and a plurality of objective lenses, and the focusing control circuit achieves the focus servo on the light incidence surface of the optical disc by using an objective lens from among the plurality of objective lenses in combination with the light source among the plurality of light sources that together generate a light beam with a focus distance longer than a focus distance of a combination of the objective lens among the plurality of objective lenses and the light source among the plurality of light sources that together are used correspondingly with the optical disc with respect to which recording and reproduction are performed.

15. The optical disc apparatus according to claim 14, wherein the focusing control circuit, in the state that the focus control circuit achieves a focus servo on the light incidence surface, is configured to achieve the focus on the information recording surface by using a light beam corresponding to the optical disc with respect to which recording and reproduction are performed.

16. Optical information equipment, comprising an optical disc apparatus, and a computing device configured to compute information reproduced by the optical disc apparatus,
wherein the optical disc apparatus comprises:
an optical head device comprising an objective lens and an objective lens actuator for moving the objective lens at least in a vertical direction to the optical disc, and configured to converge and apply a light beam to the optical disc via the objective lens by moving the objective lens;
a focus error detection circuit configured to generate a focus error signal in accordance with positional displacement of a focus of the light beam with respect to a light incidence surface of the optical disc or an information recording surface of the optical disc;
a focus control circuit configured to control the objective lens actuator based upon the focus error signal obtained by the focus error detection circuit to allow the focus position of the light beam to follow the light incidence surface or the information recording surface;
a surface-wobble-following signal storage device configured to store a surface-wobble-following signal as a driving signal that is applied to the objective lens actuator when the focus position is allowed to follow the light incidence surface of the optical disc;
a focus-search-driving signal generation circuit configured to generate a focus-search-driving signal as a driving signal for changing the focus position of the light beam with respect to the optical disc;
a superimposition signal generation circuit configured to generate a signal superimposed with the surface-wobble-following signal stored in the surface-wobble-following signal storage device and the focus-search-driving signal generated by the focus search driving signal generation circuit; and
a focusing control circuit configured to control the objective lens actuator based upon the superimposition signal generated by the superimposition signal generation circuit and achieve a focus on the information recording surface of the optical disc in a state that the focus control circuit achieves a focus servo on the light incidence surface of the optical disc and the surface-wobble-following signal storage device stores the surface-wobble-following signal.

17. A focusing control LSI provided in an optical disc apparatus where an objective lens is moved by an objective lens actuator at least in a direction vertical to an optical disc to converge a light beam to the optical disc so that at least information is reproduced, the LSI comprising:
a focus error detecting section configured to generate a focus error signal in accordance with positional displacement of a focus of a light beam with respect to a light incidence surface of the optical disc or an information recording surface of the optical disc;
a focus control section configured to allow a focus position of the light beam to follow the light incidence surface or the information recording surface based upon the focus error signal obtained by the focus error detecting section;
a surface-wobble-following signal storage section configured to store a surface-wobble-following signal as a driving signal that is applied to the objective lens actuator when the focus position is allowed to follow the light incidence surface of the optical disc;
a focus-search-driving signal generating section configured to generate a focus-search-driving signal as a driving signal for changing the focus position of the light beam with respect to the optical disc;
a superimposition signal generating section configured to generate a signal superimposed with the surface-wobble-following signal stored in the surface-wobble-following signal storage section and the focus-search-driving signal generated by the focus-search-driving signal generating section; and
a focusing control section configured to achieve a focus on the information recording surface of the optical disc based upon the superimposition signal generated by the superimposition signal generating section in a state that the focus control circuit achieves a focus servo on the light incidence surface of the optical disc and the surface-wobble-following signal storage device stores the surface-wobble-following signal.

* * * * *